United States Patent
Blaisdell et al.

(10) Patent No.: US 7,681,198 B2
(45) Date of Patent: Mar. 16, 2010

(54) WORKLOAD CATEGORIZATION FOR DETECTING ROLE CHANGES IN A HOST COMPUTING DEVICE

(75) Inventors: Russell C. Blaisdell, Austin, TX (US); John Michael Lake, Cary, NC (US); Scot MacLellan, Rome (IT)

(73) Assignee: International Business Machines Corporation, Armonk, NY (US)

( * ) Notice: Subject to any disclaimer, the term of this patent is extended or adjusted under 35 U.S.C. 154(b) by 1563 days.

(21) Appl. No.: 10/946,256

(22) Filed: Sep. 21, 2004

(65) Prior Publication Data
US 2006/0064691 A1 Mar. 23, 2006

(51) Int. Cl.
G06F 9/46 (2006.01)
G06F 15/16 (2006.01)
G06F 7/00 (2006.01)

(52) U.S. Cl. .............. 718/106; 719/328; 709/201; 707/6; 707/10

(58) Field of Classification Search .......... 718/100, 718/106; 707/6, 10; 709/201; 719/328
See application file for complete search history.

(56) References Cited

U.S. PATENT DOCUMENTS

| | | | |
|---|---|---|---|
| 5,933,594 A | 8/1999 | La Joie et al. | |
| 6,035,378 A | 3/2000 | James | |
| 6,067,412 A | 5/2000 | Blake et al. | |
| 6,173,306 B1 | 1/2001 | Raz et al. | |
| 6,820,035 B1 * | 11/2004 | Zahavi | 702/182 |
| 7,028,301 B2 * | 4/2006 | Ding et al. | 718/104 |
| 7,035,970 B1 * | 4/2006 | Zahavi | 711/114 |
| 7,051,339 B2 * | 5/2006 | Deverill et al. | 719/328 |
| 7,065,624 B1 * | 6/2006 | Zahavi | 711/170 |
| 7,243,046 B1 * | 7/2007 | Patlashenko et al. | 702/183 |
| 2002/0166031 A1 * | 11/2002 | Chen et al. | 711/141 |
| 2003/0115495 A1 | 6/2003 | Rawson, III | |
| 2003/0187967 A1 * | 10/2003 | Walsh et al. | 709/223 |
| 2003/0216890 A1 | 11/2003 | Gross et al. | |
| 2004/0021678 A1 | 2/2004 | Ullah et al. | |
| 2004/0122647 A1 * | 6/2004 | Monroe et al. | 703/22 |
| 2004/0267553 A1 * | 12/2004 | Brunton | 705/1 |
| 2005/0015504 A1 * | 1/2005 | Dorne et al. | 709/229 |
| 2005/0144332 A1 * | 6/2005 | Nellitheertha | 710/15 |
| 2007/0283353 A1 * | 12/2007 | Tremblay et al. | 718/100 |

OTHER PUBLICATIONS

Mark W. Johnson, Monitoring and Diagnosing Application Response Time with ARM, Apr. 1998, Proceedings of the IEEE Third International Workshop on Systems Management. pp. 4-13.*

Joseph V. Elarde et al., Performance Analysis of Application Response Measurement (ARM) Version 2.0 Measurement Agent Software Implementations, Conference Proceeding of Performance, Computing, and Communications Conference, Feb. 2000, pp. 190-198.*

Systems Management: Application Response Measurement (ARM) API. 1998, The Open Group, pp. 1-9, 21-25.*

* cited by examiner

Primary Examiner—Meng-Ai An
Assistant Examiner—Jennifer N To
(74) Attorney, Agent, or Firm—Robert E. Straight, Esq.; Steven M. Greenberg, Esq.; Carey, Rodriguez Greenberg & Paul, LLP

(57) ABSTRACT

A method, system and apparatus for workload categorization for detecting role changes in a host computing device. A workload characterization system for detecting role changes in a host computing device can include a transaction logging and change detection processor. The processor can be configured to log and detect role changes in the host computing device through an instrumentation monitoring interface to underlying applications supporting a workload based upon a comparison of workload patterns generated from logged transaction executions.

9 Claims, 3 Drawing Sheets

WORKLOAD CATEGORIZATION FOR DETECTING ROLE CHANGES IN A HOST COMPUTING DEVICE

BACKGROUND OF THE INVENTION

1. Statement of the Technical Field

The present invention relates to the field of autonomic computing, and more particularly to resource monitoring to autonomically manage resources processing computing workloads.

2. Description of the Related Art

Among the many challenges faced by those who manage the capacity and performance of an enterprise system is the characterization of computer system and network resource consumption by a particular application or workload. The continuing movement towards distributed systems has complicated this activity as there are several methods for collecting transaction data on a single system: For instance, a transaction processing monitor can be configured to capture some form of resource consumption data. Similarly, some database management systems provide facilities for capturing transaction activity within the context of each access request.

Facilities within a particular operating system also may have a built-in notion of what a transaction is and will store or report information related to that transaction. Furthermore, applications developers can imbed instrumentation within application code in order to obtain transaction specific data. Finally, application profilers for a particular operating environment can gather large amounts of data relating to the behavior of an application hosted within the operating environment. In all cases, however, when applied to the distributed environment, it can be difficult to track resource consumption by a transaction when several elements in a network contribute towards the completion of a transaction Recently, several computing vendors have collaborated to develop an open, vendor-neutral approach to manage the performance of distributed applications. The Application Response Measurement (ARM) interface, is an application programming interface (API) for measuring end-to-end application response time. The ARM API allows vendors to create management-ready applications and it allows end users to measure and control the total performance of their business-critical distributed applications.

The ARM API is a simple API that applications can use to pass vital information about a transaction to an agent. Specifically, to monitor the progress of a transaction, an application need only call the ARM API just prior to the start of the transaction and again before the completion of the transaction. Consequently, the ARM API calls can be used to identify the application, the transaction, and optionally the user, and provide the status of each transaction when it completes. This is sufficient information for the management solution to answer vital questions regarding the operation and performance of the computing system hosting the workload.

Whereas optimally configuring a virtual log can be problematic generally for who manage the capacity and performance of an enterprise system, in an autonomic system, the problem can be particularly acute. For the uninitiated, autonomic computing systems self-regulate, self-repair and respond to changing conditions, without requiring any conscious effort on the part of the computing system operator. To that end, the computing system itself can bear the responsibility of coping with its own complexity. The crux of autonomic computing relates to eight principal characteristics:

I. The system must "know itself" and include those system components which also possess a system identity.

II. The system must be able to configure and reconfigure itself under varying and unpredictable conditions.

III. The system must never settle for the status quo and the system must always look for ways to optimize its workings.

IV. The system must be self-healing and capable of recovering from routine and extraordinary events that might cause some of its parts to malfunction.

V. The system must be an expert in self-protection.

VI. The system must know its environment and the context surrounding its activity, and act accordingly.

VII. The system must adhere to open standards.

VIII. The system must anticipate the optimized resources needed while keeping its complexity hidden from the user.

In an on demand computing environment, the role of a host computing device and the workload processed in the host can vary based upon business need, the point-in-time when the workload is processed, the volume of different workloads experienced at that time, and the relative priorities of those workloads. A change in demand for specific applications can result in the re-provisioning of a host computing device that had previously served requests for a particular workload, into a different role hosting different applications.

Accordingly, understanding that a change has transpired, and identifying the new role of the host computing device can be fundamental to correctly optimize the usage of the host computing device. Examples include the active monitoring of the health and of the performance of the applications active within the host computing device. Knowing the role of the host computing device can affect the monitoring policy applied to the host computing device. For instance, while a host computing device may support the operation of a database management system, the use of the database management system can change from supporting real-time transactions to mere batch transactions. Clearly, the monitoring policy for a database supporting real-time transactions will differ from the monitoring policy for a database supporting only batch transactions, if only to disable interactive response time-related sensors.

SUMMARY OF THE INVENTION

The present invention addresses the deficiencies of the art in respect to resource monitoring and provides a novel and non-obvious method, system and apparatus for workload categorization for detecting role changes in a host computing device. A workload characterization system for detecting role changes in a host computing device can include a transaction logging and change detection processor. The processor can be configured to log and detect role changes in the host computing device through an instrumentation monitoring interface to underlying applications supporting a workload based upon a comparison of workload patterns generated from logged transaction executions.

In a preferred aspect of the present invention, a workload categorization method for detecting role changes in a host computing device can include monitoring transactions in the host computing device and categorizing the transactions. The transactions can be grouped according to the categorization in order to form a new workload pattern. Importantly, the new workload pattern can be compared to a previously stored workload pattern. Consequently, it can be determined that a role change has occurred in the host computing device if the workload patterns differ.

In the preferred embodiment, the monitoring step can include receiving notifications of transaction executions through an instrumentation interface and logging records for corresponding ones of the notifications. Specifically, the notifications of transaction executions can be received through an ARM interface. Subsequently, each of the transactions can be characterized according to transaction type. Preferably, the grouping step can include counting a number of transactions having a like characterization in order to measure a magnitude of each of set of like characterized transactions.

In accordance with the present invention, the determining step can include determining that a role change has occurred in the host computing device if the workload patterns differ by a threshold amount. Yet, the determining step further can include determining that a role change has not occurred in the host computing device if characterizations differ only in magnitude, but the characterizations do not differ in type. In either case, the performing monitoring, characterizing, comparing and determining steps can be performed in non-consecutive intervals so as to better detect a change in role for the host computing device.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for characterizing workloads according to computed transaction patterns. In accordance with the present invention, individual transactions for a workload can be monitored and classified individually according to a specified criteria. Like transactions can be grouped together and a pattern of differently grouped transactions can be generated. The generated pattern can be compared to a previously generated pattern to determine if the two patterns deviate significantly. If not, it can be presumed that the role of the host for the workload has not changed. In contrast, if the two patterns differ significantly, it can be presumed that the role for the host has changed and a notification reflecting the change can be provided to monitoring logic.

Figure 1:
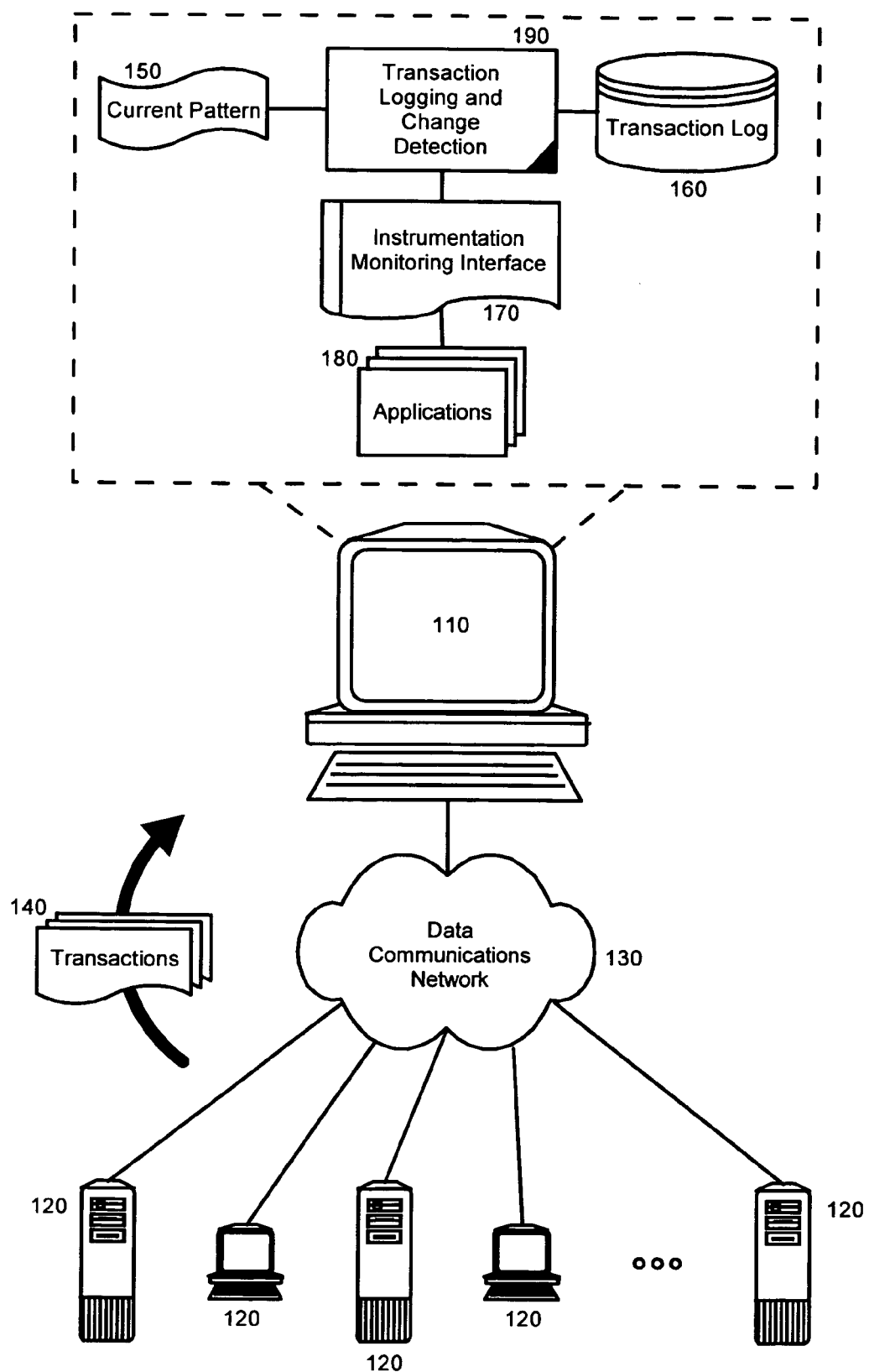
FIG. 1 is a schematic illustration of a computing system configured for the characterization of workloads based upon transaction patterns.

In further illustration, FIG. 1 is a schematic illustration of a computing system configured for the characterization of workloads based upon transaction patterns. The system can include a host computing device 110 coupled to one or more client and peer computing devices 120 over a data communications network 130. Client ones of the computing devices 120 can request the host computing device 110 support a workload involving one or more transactions 140. In this regard, the workload itself can be characterized by the unique combination of transactions 140 and the magnitude of transactions 140 required to be processed by the host computing device 110 in order to support the workload.

The host computing device 110 can include one or more applications 180 configured to process the transactions 140. The applications 180 can include, for example, database management logic, network communications logic, computational logic, and the like. Importantly, the applications 180 can be instrumented through an instrumentation monitoring interface 170. An exemplary instrumentation monitoring interface 170 can include the ARM interface known in the art. Using the instrumentation monitoring interface 170, a transaction logging and change detection process 190 can monitor individual ones of the transactions 140 which can be classified and utilized to generate a workload pattern as will be further described herein.

Specifically, each of the transactions 140 can written to a transaction log 160 and each of the transactions 140 can be classified according to a pre-defined criteria such as a specific one of the applications 180 designated to process the transaction 140, or specific transaction type, to name only a few. Like classified transactions can be grouped together. Alternatively, a mere count of like transactions can be kept in a vector, array or other suitable data structure. In any case, the aggregation of classified ones of the transactions 140 can form the basis of a currently experienced workload pattern 150. As such, subsequently formed workload patterns can be compared to the current pattern 150 to detect a change in role for the host computing device 110 from supporting one workload to the next.

Figure 2:
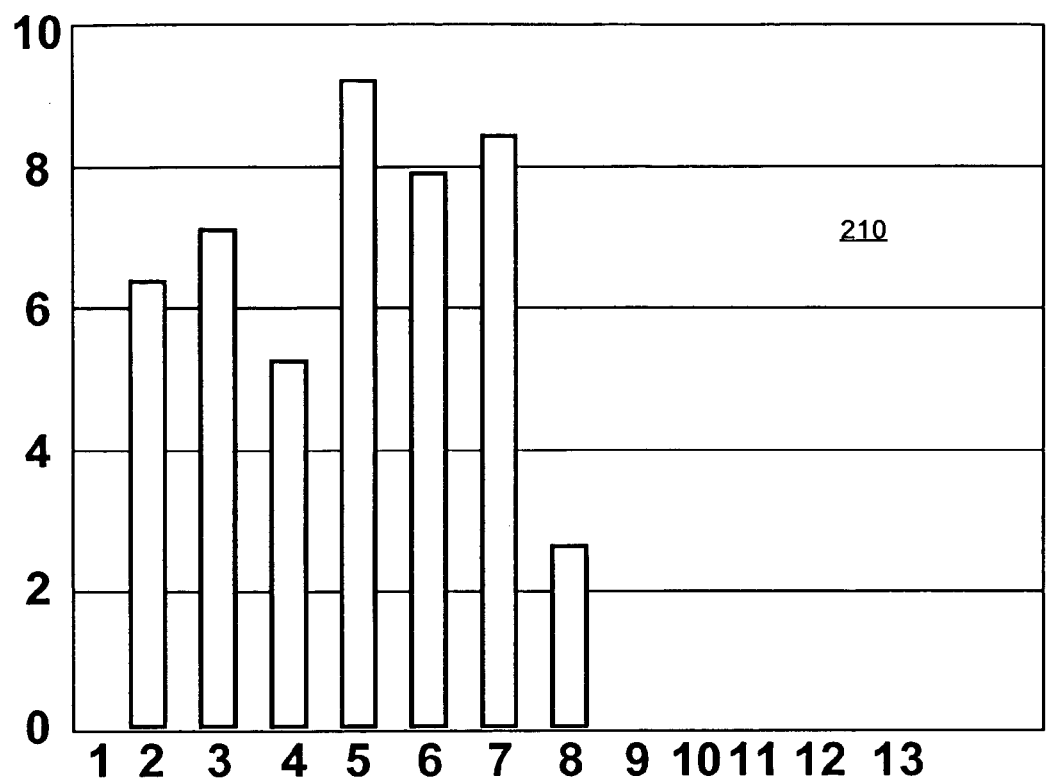
FIG. 2 is a pictorial illustration of two graphs of different, exemplary workload transaction patterns which indicate a change in role for the computing system of FIG. 1; and, FIG. 3 is a flow chart illustrating a process for characterizing workloads upon transaction patterns for use in the system of FIG. 1.
Figure 2:
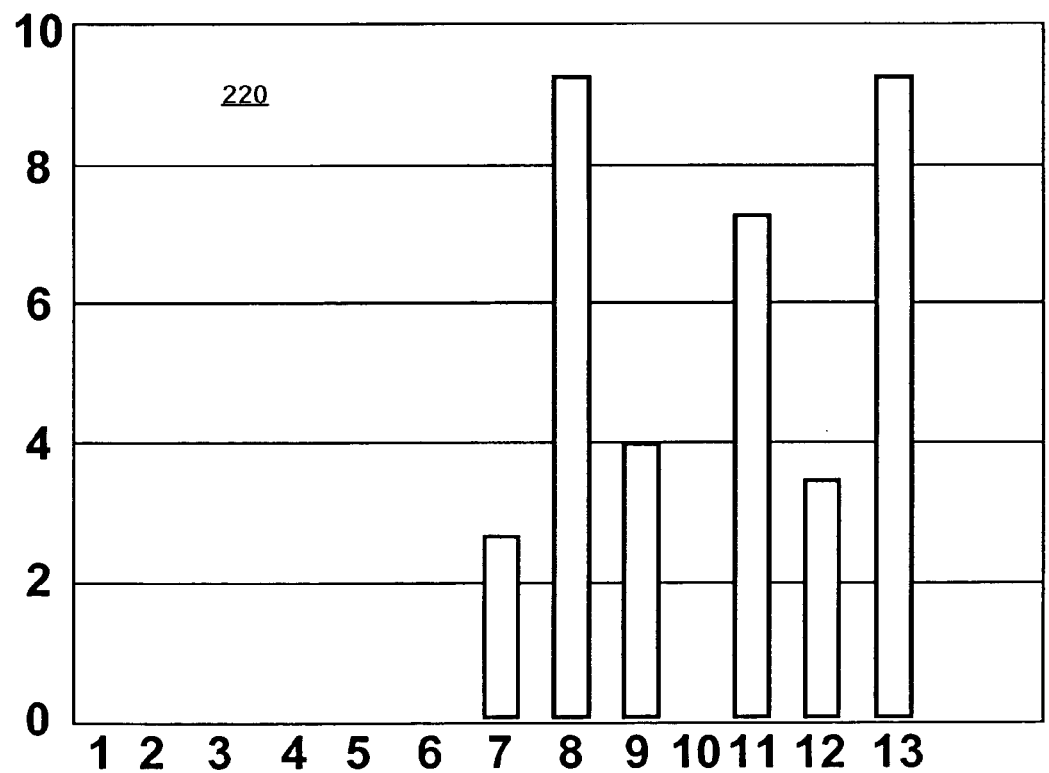

In this regard, FIG. 2 is a pictorial illustration of two graphs of different, exemplary workload transaction patterns which indicate a change in role for the computing system of FIG. 1. As shown in FIG. 2, a first workload pattern 210 can be generated for the aggregation of seven like classifications for monitored transactions. The magnitude of each like classification can indicate the extent of the like classification, for instance the number of transactions requested of a like type, and the amount of resources consumed in processing the transaction, to name a few.

At a subsequent monitoring interval, a different workload pattern 220 can be produced for a different aggregation of six like classifications for monitored transactions. As before, the magnitude of each like classification can indicate the extent of the like classification. Nevertheless, when comparing the workload pattern 210 to the workload pattern 220, it will be apparent that the transactions and the extent of the transactions processed in association with the workload pattern 210 differ from those of the workload pattern 220. Accordingly, in the present invention, it will be concluded that the workload pattern 210 deviates from the workload pattern 220 and that the role of the host computing device has changed.

Figure 3:
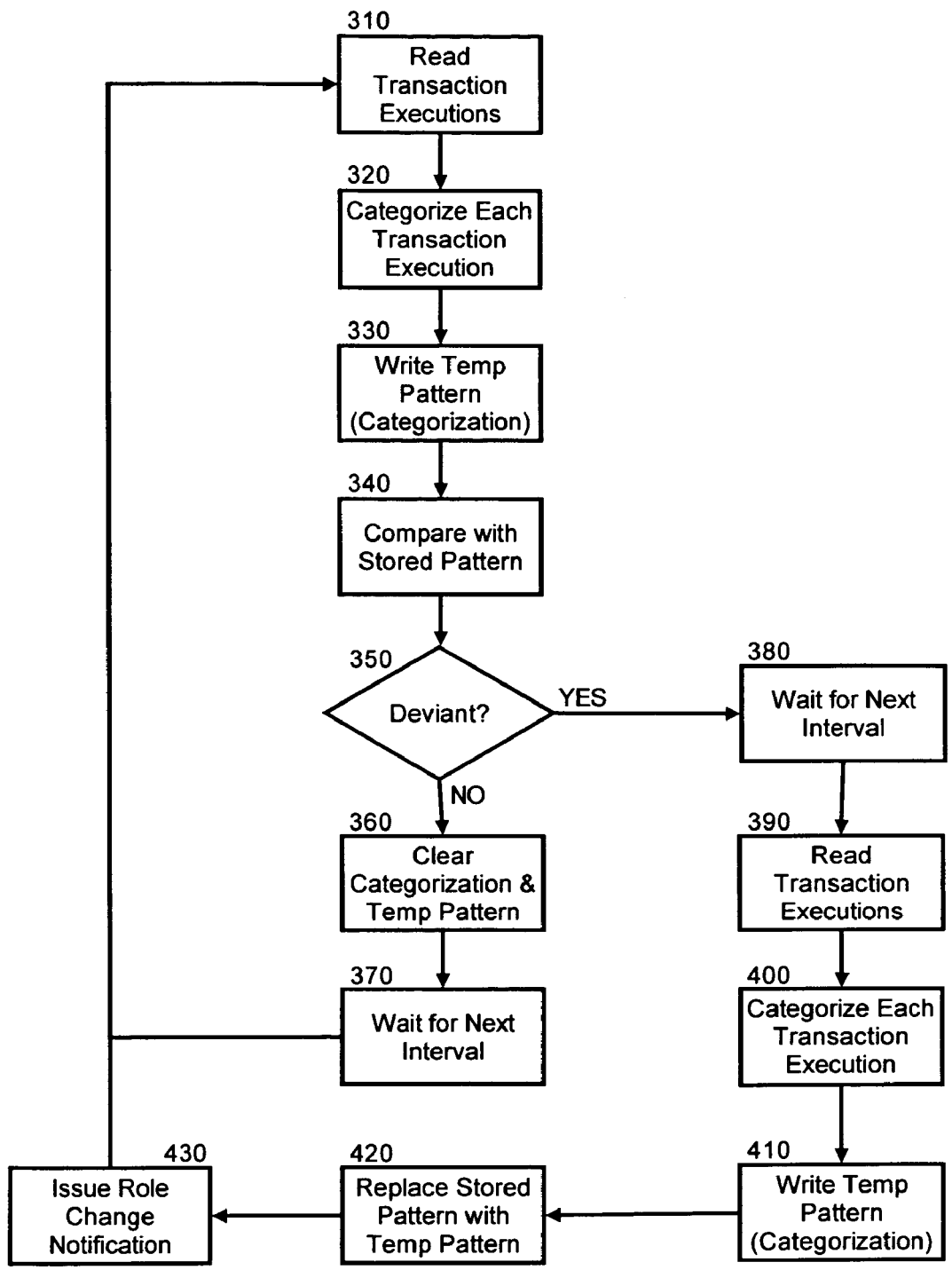

Referring now to FIG. 3, a flow chart is shown which illustrates a process for characterizing workloads based upon transaction patterns for use in the system of FIG. 1. The process can begin in block 310 when a set of transaction executions can be read, for example through the operation of transaction monitoring logic via an instrumentation and monitoring interface. Notably, in a preferred aspect of the invention, the transaction executions can be read through the course of a monitoring interval. During this interval, in block 320 each transaction execution can be categorized, for example according to type.

Based upon the categorization of the transaction executions over the monitoring interval, a temporary workload pattern can be produced in block 330 which is representative of the role of the host computing device during the monitoring interval. Subsequently, in block 340, the temporary workload pattern can be compared to a previously stored workload pattern from a previous monitoring interval. In decision block 350 it can be determined if the temporary workload pattern deviates from the previously stored workload pattern. In this regard, some deviation is permitted and an exact match is not required to avoid a determination that the workload patterns differ from one another. Rather, a threshold level of difference can be required. For instance, in a preferred aspect of the invention, the relative differences in magnitude of the different categorizations can form the basis of a determination of deviation rather than the absolute differences in magnitude of the categorizations.

In block 350, if it is determined that the workload patterns do not differ, or do not differ significantly enough, in block 360 the categorization produced for the transaction executions can be discarded as can the temporary workload pattern. Subsequently, in block 370 the process can wait until the next interval before repeating the process of blocks 310 through 350. Preferably, the process can wait until the interval following the next interface to more fully detect a change in patterns. Still, it will be recognized by the skilled artisan that patterns may evolve slowly over time depending upon a number of factors including number of users. As such, the template patterns can be continuously updated at a specified interval based upon the factors at hand.

In any case, returning to block 350, if it is determined that the workload patterns differ significantly enough, in block 380 the process can wait until the next interval and in block 390, a set of transaction executions can be read. During this interval, in block 400 each transaction execution can be categorized, for example according to type. Based upon the categorization of the transaction executions over the monitoring interval, a temporary workload pattern can be produced in block 410 which is representative of the role of the host computing device during the monitoring interval. In block 420, the stored workload pattern can be replaced with the temporary pattern and in block 430 monitoring logic can be notified that a role change has occurred in the host computing device.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A workload categorization method executing on a computer system for detecting roles change in a host computing device, the method comprising the step of:
   monitoring transactions in the host computing devices, wherein monitoring step comprises the steps of:
      receiving notifications of transaction executions through an instrumented interface; and
      logging records for corresponding ones of said notifications;
   categorizing said transactions according to transaction type;
   grouping said transactions according to said categorizing, wherein said grouping comprises measuring a magnitude of each of categorization by counting a number of transactions having a like characterization in each categorization, and wherein said grouping forms a new workload pattern;
   comparing said new workload pattern to a previous stored workload pattern wherein said comparing comprises comparing a transaction types and magnitude for each categorization; and
   determining that a role change has occurred in the host computing device if said workload patterns differ by a threshold amount.

2. The method of claim 1, wherein said receiving step comprises the step of receiving notifications of transaction executions through an Application Response Measurement (ARM) interface.

3. The method of claim 1, wherein said determining step further comprises the step of determining that a role change has not occurred in the host computing device if characterizations differ only in magnitude, but said characterizations do not differ in type.

4. The method of claim 1, further comprising the step of performing said monitoring, characterizing, comparing and determining steps in at least one subsequent interval.

5. A computing system configured for detecting role changes in a host computing device, the computing system comprising a transaction logging and change detection processor performing the following steps:
   monitoring transactions in the host computing devices, wherein monitoring step comprises the steps of:
      receiving notifications of transaction executions through an instrumented interface; and
      logging records for corresponding ones of said notifications;
   categorizing said transactions according to transaction type;
   grouping said transactions according to said categorizing, wherein said grouping comprises measuring a magnitude of each of categorization by counting a number of transactions having a like characterization in each categorization, and wherein said grouping forms a new workload pattern;

comparing said new workload pattern to a previous stored workload pattern wherein said comparing comprises comparing a transaction types and magnitude for each categorization; and determining that a role change has occurred in the host computing device if said workload patterns differ by a threshold amount.

6. A machine readable storage located in a computer system, the machine readable storage having stored thereon a computer program for detecting role changes in a host computing device, the computer program comprising routine set of instructions which when executed by a machine causes the machine to perform the steps of:

monitoring transactions in the host computing devices, wherein monitoring step comprises the steps of:

receiving notifications of transaction executions through an instrumented interface; and logging records for corresponding ones of said notifications;

categorizing said transactions according to transaction type;

grouping said transactions according to said categorizing, wherein said grouping comprises measuring a magnitude of each of categorization by counting a number of transactions having a like characterization in each categorization, and wherein said grouping forms a new workload pattern;

comparing said new workload pattern to a previous stored workload pattern wherein said comparing comprises comparing a transaction types and magnitude for each categorization; and determining that a role change has occurred in the host computing device if said workload patterns differ by a threshold amount.

7. The method of claim 6, wherein said receiving step comprises the step of receiving notifications of transaction executions through an Application Response Measurement (ARM) interface.

8. The machine readable storage of claim 6, wherein said determining step further comprises the step of determining that a role change has not occurred in the host computing device if characterizations differ only in magnitude, but said characterizations do not differ in type.

9. The machine readable storage of claim 6, further comprising an additional set of routine instructions for additionally causing the machine to perform the steps of performing said monitoring, characterizing, comparing and determining steps in at least one subsequent interval.

* * * * *